United States Patent [19]

Ree et al.

[11] 4,153,661
[45] May 8, 1979

[54] METHOD OF MAKING POLYTETRAFLUOROETHYLENE COMPOSITE SHEET

[75] Inventors: Buren R. Ree, Stillwater; Louis A. Errede, North Oaks; Gary B. Jefson, St. Paul; Bruce A. Langager, New Brighton, all of Minn.

[73] Assignee: Minnesota Mining and Manufacturing Company, St. Paul, Minn.

[21] Appl. No.: 827,785

[22] Filed: Aug. 25, 1977

[51] Int. Cl.$^2$ .................. B29D 27/00; B29D 7/14; B29B 1/04
[52] U.S. Cl. ........................... 264/120; 51/295; 264/122; 264/127; 264/175
[58] Field of Search .......... 264/49, 108, 120, 122, 264/127, 175, 349; 51/295, 298 R

[56] References Cited

U.S. PATENT DOCUMENTS

| | | | |
|---|---|---|---|
| 2,782,180 | 2/1957 | Weidman | 264/122 |
| 3,010,950 | 11/1961 | Thomas | 264/127 |
| 3,242,246 | 3/1966 | Stand | 264/127 |
| 3,281,511 | 10/1966 | Goldsmith | 264/49 |
| 3,890,417 | 6/1975 | Vallance | 264/49 |
| 4,049,396 | 9/1977 | Hiles | 51/295 |

Primary Examiner—James B. Lowe
Attorney, Agent, or Firm—Cruzan Alexander; Donald M. Sell; Richard Francis

[57] ABSTRACT

A polytetrafluoroethylene composite sheet having a tensile strength of at least one megapascal and comprising particulate material distributed in a matrix of interentangled polytetrafluoroethylene fibrils. The composite sheet is prepared by blending the particulate material with polytetrafluoroethylene aqueous dispersion in the presence of sufficient lubricant water to exceed the absorptive capacity of the solids yet maintain a putty-like consistency, subjecting the putty-like mass to intensive mixing at a temperature between 50° C. and 100° C. to cause initial fibrillation of the polytetrafluoroethylene particles, biaxially calendering the putty-like mass to cause additional fibrillation of the polytetrafluoroethylene particles while maintaining the same water content and drying the resultant sheet.

17 Claims, 3 Drawing Figures

METHOD OF MAKING POLYTETRAFLUOROETHYLENE COMPOSITE SHEET

BACKGROUND OF THE INVENTION

This invention relates to a method of preparing a composite sheet by mixing in an aqueous media particulate material and polytetrafluoroethylene (hereinafter referred to as PTFE) particles which are subsequently fibrillated therein to form a unitary matrix of entangled PTFE fibrils containing the particulate material. The invention relates further to a high tensile strength composite sheet formed by this method.

Because of its unique hydrophobic surface character, high temperature stability and inertness, PTFE is used to great advantage in many situations. Microporous sheets of PTFE are used advantageously as electrolytic diaphragms for oxygen generators, in fuel cells, for filtering media, as battery separators and in other areas which require a relatively inert hydrophobic porous member.

It has been long recognized that, under shear stresses, small particles of PTFE in the presence of a suitable liquid lubricant will form fibrils or fibers of a microscopic size. Early processing involved adding particulate PTFE to white oil and extruding the mixture to obtain fibrillation. Later processes involved employing other hydrocarbon liquid lubricants with PTFE powders. Some processes require sintering of the fibrillated product to produce a final integrated porous article. Certain other processes involved employing a removable material to obtain pores or voids in the composite. This removable material is added in the process and removed after fibrillation and formation of the article. Examples of such removable materials include polymethylmethacrylate which may be dissolved from the sheet by suitable organic solvent or heat-fugitive materials which are removed by heating, e.g., during sintering.

Microporous PTFE sheets are known in the art, as exemplified by Goldsmith (U.S. Pat. No. 3,281,511) which discloses the production of a microporous sheet material which is produced by mixing PTFE powder with a carrier and a petroleum distillate such as "Stoddard" solvent (a flammable material) to produce a sheet. Goldsmith requires a readily removable filler such as ammonium carbonate to, upon removal, produce porosity in the resultant sheet. Stand (U.S. Pat. No. 3,242,246) calenders a mixture of PTFE particles and trifluorovinyl chloride to produce a homogeneous mass which is dipped into a solvent which dissolves the trifluorovinyl chloride and then sinters the resultant structure to obtain a porous article. Forgione et al (U.S. Pat. No. 3,766,013) blends a water-soluble carrier polymer (for enzyme material) with PTFE powder and an inert, solid, water-soluble component material and subjects the mixture to high shear to fibrillate the PTFE.

Vallance (U.S. Pat. No. 3,890,417) discloses a method of making porous diaphragms comprising preparing an aqueous dispersion of PTFE and a solid removable particulate filler, thickening the dispersion to effect agglomeration of the solid PTFE particles, forming the thickened dispersion into a sheet, biaxially calendering the sheet and removing the solid particulate filler material. Vallance's articles appear to require additional support means such as embedded plastic scrims to make them self-supporting.

BACKGROUND OF THE INVENTION

The present invention provides a novel method of producing a uniformly porous, high void-volume composite sheet comprised of particulate material distributed uniformly throughout a matrix formed of inter-entangled, fibrillated PTFE fibrils. The novel sheet of the invention has a high tensile strength of at least one megapascal and is substantially uniformly porous, making it suited for use as a filtering material, for electrolytic cells, as a gas diffusion membrane and for many other purposes which may be now known or which may later become known in the art for such materials. The method requires neither organic lubricants nor extraction of a removable additive material to produce porosity.

The method involves first blending particulate material with PTFE aqueous dispersion and then adding sufficient lubricant water to exceed the absorptive capacity of the solids in the mixture yet maintain a putty-like consistency. The resultant putty-like mass is then intensively mixed at a temperature between 50° C. and 100° C. to fibrillate initially the PTFE particles and, while maintaining the same water level, the resultant mass is biaxially calendered between heated calendering rolls maintained at about 50° C. to about 100° C. to cause further fibrillation, producing a composite sheet which is then dried.

Biaxial calendering is accomplished by rotating a calendered sheet at 90° to the calendering machine direction and repeating the calendering operation with a reduction of the space between the calendering rolls or including folding the calendered sheet on itself before rotating or both. Such calendering provides uniform multidirectional fibril formation, imparting a high degree of tensile strength in the resultant sheet.

The dried resultant composite comprises particulate material and PTFE fibrils in a weight ratio of about 3:1 to 50:1 particulate material to PTFE fibrils. For the most part, the PTFE fibrils will have a diameter in the range of about 250 Å to 2500 Å. The composite is characterized by having a tensile strength of at least one megapascal.

There are several key steps, unknown in prior art methods to produce products of this type, which are required in the method of the invention to produce the unique high tensile strength PTFE composite of the invention. The initial intensive mixing should be accomplished at an elevated temperature between about 50° C. and about 100° C. or the sheet will not have a sufficiently high tensile strength. Additionally, the water content of the putty-like mass being processed should be maintained above or near the absorptive capacity of the solids therein or else proper fibrillation will not occur.

Applicant has discovered that, if such intensive mixing does not occur prior to calendering or if the intensive mixing is at a temperature substantially less than 50° C., the initial fibrillation will be incomplete and subsequent fibrillation by calendering will not correct the situation. The net result of failure to mix intensively at an elevated temperature, 50° C. to 100° C., will be a very weak low tensile strength composite sheet.

THE DRAWING

The invention is illustrated further by reference to the accompanying drawing and the detailed description which follows.

DETAILED DESCRIPTION OF THE INVENTION

Figure 1:
FIG. 1 is a photomicrograph of a composite sheet of the invention magnified about 5500 diameters.
Figure 2:
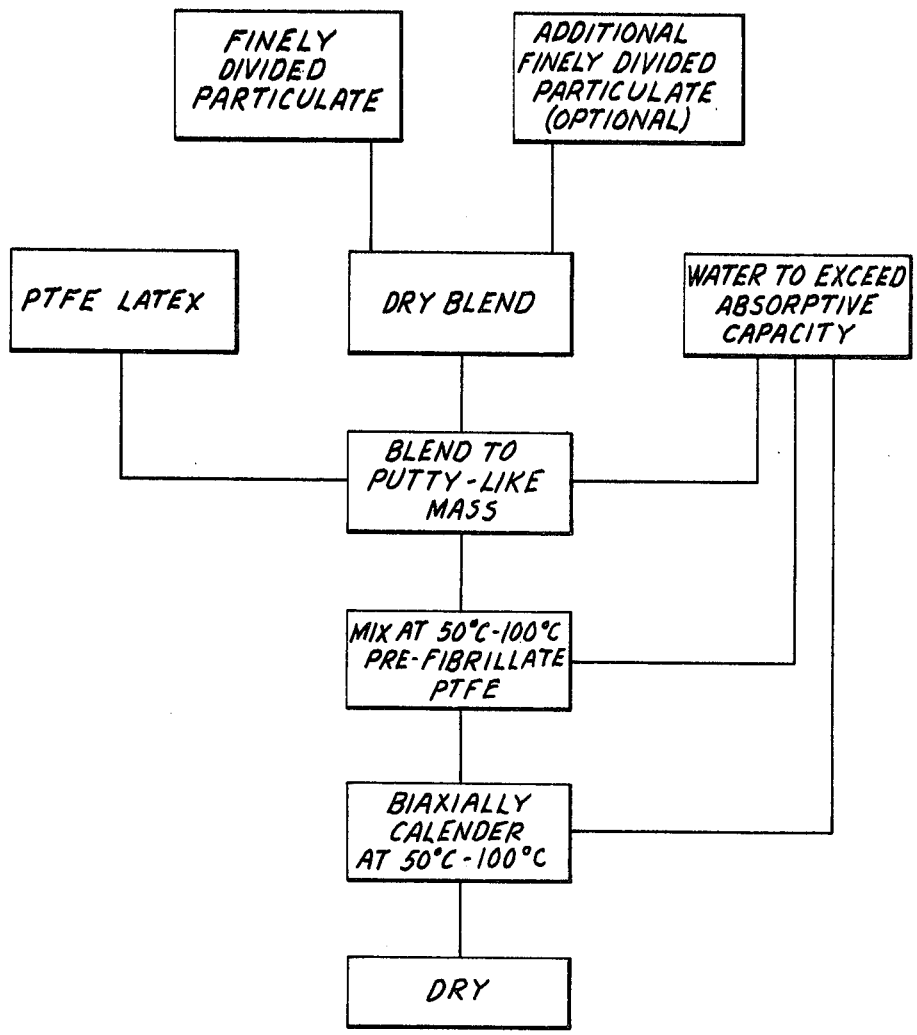
FIG. 2 is a diagrammatic view showing the process steps of the invention.

The high tensile strength PTFE composite sheet material of the invention is prepared by dry blending the particulate materials employed until a uniform dispersion is obtained and blending the particulate material with the PTFE aqueous dispersion to form a putty-like mass. Sufficient lubricant water is added to the mass to exceed the absorptive capacity of the solids yet maintain a putty-like consistency. The absorptive capacity of the solids of the mixture is noted to have been exceeded when small amounts of water can no longer be incorporated into the putty-like mass without separation. This condition should be maintained throughout the entire mixing operation. The putty-like mass is then subjected to intensive mixing at a temperature maintained between about 50° C. and about 100° C. for a time sufficient to cause initial fibrillation of the PTFE particles. This intensive mixing at the specified temperature is essential in obtaining high strength films.

Mixing times will typically vary from 0.5 to 10 minutes to obtain the necessary initial fibrillation of the PTFE particles. Initial fibrillation causes partial disoriented fibrillation of a substantial portion of the PTFE particles.

Initial fibrillation will be noted to be at an optimum immediately prior to the point when the mixture being subjected to intensive mixing no longer remains as a smooth cohesive mass. That is, the mixing batch begins to separate into pieces or lumps. Mixing beyond this point will produce a composite sheet of lower tensile strength.

The devices employed for obtaining the necessary intensive mixing are commercially available intensive mixing devices which are sometimes referred to as internal mixers, kneading mixers, double-blade batch mixers as well as intensive mixers. The most popular mixer of this type is the sigma-blade or sigma-arm mixer. Some commercially available mixers of this type are those sold under the common designations Banbury mixer, Mogul mixer, C. W. Brabender Prep mixer and C. W. Brabender sigma blade mixer. Other suitable intensive mixing devices may also be used.

The putty-like mass is then transferred to a calendering device where it is calendered between rolls maintained at about 50° C. to about 100° C. to cause additional fibrillation of the PTFE particles, while maintaining the water level of the mass at least at a level of near the absorptive capacity of the solids, until sufficient fibrillation occurs to produce the high tensile strength sheet material. Preferably the calendering rolls are made of a rigid material such as steel. A useful calendering device has a pair of rotatable opposed calendering rolls each of which may be heated and one of which may be adjusted toward the other to reduce the gap or nip between the two. Typically, the gap is adjusted to a setting of 10 millimeters for the initial pass of the mass and, as calendering operations progress, the gap is reduced until adequate fibrillation occurs. At the end of each successive calendering operation, the sheet is folded and then rotated 90° to obtain biaxial fibrillation of the PTFE particles.

The calendered sheet is then dried under conditions which promote rapid water evaporation yet will not cause damage to the composite sheet or any constituent therein. Preferably the drying is carried out at a temperature below 100° C. The preferred means of drying is by use of a forced air oven. The preferred drying temperature range is from 20° C. to about 100° C. The most convenient drying method involves suspending the composite sheet at room temperature for at least 24 hours. The time for drying may vary depending upon the particular composition, some particulate materials having a tendency to retain water more than others. Typically, drying times will vary from about 1 hour to about 100 hours.

The resultant composite sheet has a tensile strength when measured by a suitable tensile testing device such as an Instron tensile testing device of at least one megapascal. For the most part, composite sheets according to the invention have a tensile strength in excess of three megapascals.

FIG. 1, a photomicrograph, shows a typical composite sheet of the invention. The composite sheet shown in FIG. 1 is formed of PTFE and kaolin particulate material and has a matrix of inter-entangled elongated PTFE fibrils which contain a multiplicity of minute particles of kaolin particulate material.

The PTFE aqueous dispersion employed in producing the high tensile strength PTFE composite sheet of the invention is a milky-white aqueous suspension of minute PTFE particles. Typically, the PTFE aqueous dispersion will contain about 30% to about 70% by weight solids, the major portion of such solids being PTFE particles having a particle size in the range of about 0.05 to about 0.5 microns. The PTFE aqueous dispersion may contain other ingredients, for example, surfactant materials and stabilizers which promote continued suspension of the PTFE particles.

Such PTFE aqueous dispersions are presently commmercially available, for example, under the trade names "Teflon" 30, "Teflon" 30B or "Teflon" 42. "Teflon" 30 and "Teflon" 30B contain about 59% to about 61% solids which are for the most part 0.05 to 0.5 micron PTFE particles and from about 5.5% to about 6.5% by weight (based on weight of PTFE resin) of non-ionic wetting agent, typically octylphenol polyoxyethylene or nonylphenol polyoxyethylene. "Teflon" 42 contains about 32 to 35% by weight solids and no wetting agent but has a surface layer of organic solvent to prevent evaporation.

The particulate material is preferably substantially insoluble in water. That is, a suitable particulate material will not be dissolved by more than a major amount of its weight in a fixed volume of aqueous media into which it is mixed at 20° C. Particulate materials, which dissolve in amounts more than a major amount, may be useful but in such case excess particulate material should be used to compensate for that dissolved. The particulate material may be of an inorganic or an organic nature. Suitable particulate materials include clays (e.g., kaolin), talc, titanium dioxide, silica, metals (e.g., lead, copper, zinc, aluminum, iron or steel), copper oxide, ferrous oxide, barium ferrite, molybdenum sulfide, silicon carbide, micaceous material (e.g., mica or vermiculite), calcium carbonate, carbon (e.g., graphite, carbon black or activated charcoal), casein, zein, alumina, garnet, organic pigments (e.g., phthalocyanine pigments), glass beads or spheres, plastic spheres (e.g., formed of polyethylene, polypropylene), elastomeric spheres (e.g., formed of polyurethane), the like, and mixtures thereof.

The particulate material may have a spherical shape or an irregular shape. Particulate material which has been found useful in the invention has an apparent size within the range of 0.1 to about 600 microns, preferably in the the range of 1 to 100 microns. It has been found advantageous in some instances to employ particulate materials in two or more particle size ranges falling within the broad range. As an example, particles having an average size of 20–30 microns may be employed in combination with particles having an average size in the range 200–250 microns.

Some particle size reduction may take place during the high shear mixing and the calendering operations, depending upon the friability of the particulate material. Thus, while the particulate material may initially be rather large, it may ultimately be reduced to a finer size in the final product.

Additional particulate materials may be advantageously added to the mixture of the PTFE aqueous dispersion and the primary particulate material to provide further improvement in or modification of the composite films of the invention. For example, relatively large particle size micaceous particles such as vermiculite may be added to further increase the tensile strength. It has been found that from 1% to about 100% by weight (based on the total solids in the mixture) of vermiculite particles having an average particle size of about 150 to about 250 microns will produce a substantial increase in tensile strength. The same result may be obtained by the addition of from about 1% to about 100% by weight (based on the total solids in the mixture) of certain clays, e.g., kaolin, of a smaller average particle size, e.g., from about 2 to 20 microns.

Certain other additive ingredients may also be advantageously added to the mixture of the PTFE and particulate materials. Suitable additives which have been found to be useful include synthetic and natural polymers such as polyethylene, polypropylene, hexafluoropropylene tetrafluoroethylene copolymer (e.g., that sold under the trade designation "FEP" 120), ionomers (such as that sold under the tradename "Surlyn" D), fluorinated polymers (such as that sold under the trade designation "Kel-F"), styrene butadiene block copolymer (such as that sold under the trade designation "Kraton" 1107), ethylene vinyl acetate copolymer (such as that sold under the tradename "Elvax" 260), cellulose acetate, polyamide and polyurethane. Such materials may be added in amounts up to 100% by weight of the total solids.

In some instances, it may be desirable to facilitate processing to add supplemental wetting agents such that the final wetting agent concentration, on a dry basis, is up to about 2% by weight based upon the total solids in the resultant composite sheet material of the invention. The most preferred supplemental wetting agents include zinc stearate and ammonium perfluorooctoate.

It has been found desirable in some instances to add minor amounts of partially hydrolyzed polyacrylamide (such as that sold under the trade designation "Separan" AP30) to produce a composite sheet which has an unusual degree of drapability and extremely pleasant hand or feel. The amount of partially hydrolyzed polyacrylamide is typically about 0.1% by weight based upon a total solids of the composite sheet material of the invention.

Minor amounts of a water-sweelable, thermoplastic material will also produce a higher tensile strength sheet. Typically, the amount of water-swellable thermoplastic material will be on the order of 5% to about 10% by weight of the total solids. Water-swellable thermoplastic materials found to be suitable additives include casein, zein, cross-linked hide glue, polyamide such as that sold under the trade designation "Elvamide" which may be plasticized with glycerin.

Examination of the composite films containing the water-swellable thermoplastic material by scanning electron microscope reveals that this additive material becomes smeared into large plate-like domains which apparently strengthens the composite sheet material.

Larger particle size water-swellable thermoplastic materials are preferred because they are generally noted to strengthen the composite sheet material of the invention with little improvement in the strength noted by the addition of small particle size water-swellable thermoplastic materials. It has been found experimentally that particles less than 150 microns generally do not increase the strength of the product while particles on the order of 300 to 600 microns will generally produce a significant increase in tensile strength. The small particles tend to produce a stiffer, more board-like composite sheet and thus their addition should be avoided where a soft drapable product is desired.

The tensile strength of the composite film of the invention may also be increased by the addition of abrasive particles to the mixture prior to intensive mixing. Abrasive particles having a particle size in the range of about 5 to about 60 microns provide the most significant increase in tensile strength. The preferred loading levels to obtain significant strengthening in the composite film are on the order of about 20% to about 30% by weight based upon total solids. The preferred abrasive particles are relatively hard, having a Mohs hardness value in the range of about 6.0 to 9.5. Useful abrasive particles include silica, garnet, alumina, silicon carbide and the like.

The composite films of the invention may also be strengthened by the addition of certain dispersing agents in amounts of about 1% to 25% based upon the total solids of the mixture. The dispersing agents are preferably added prior to the intensive mixing. Dispersing agents which have been found to be useful include polyethylene oxide (e.g., that sold under the trade designation "Carbowax 750," a polyethylene oxide having a molecular weight of 750), polyoxyethylene distearates (e.g., that sold under the trade designation "Emerest" 2642) and lecithin.

It should be noted that the previously stated weight ratio of PTFE to particulate material will be maintained notwithstanding the inclusions of aforementioned additive materials.

The novel method of the invention produces composite materials with unique and useful properties. They are tough, attractive, extremely pliable composite films. Some resemble soft leather such as doe skin. Some are as drapable as jersey cloth, as wettable as chamois skin, and as pleasant to touch as kid leather. Most do not support combustion and are thermally stable to temperature up to about 225° C. or higher. The composite materials may be formulated to be electronic insulators which are ionic conductors when immersed in an electrolyte. They can also be semipermeable membranes with respect to certain liquids and gas mixtures. They are generally porous to water vapor. They can be formulated to be insoluble in organic solvents and to withstand hot corrosive liquids such as concentrated $H_2SO_4$, $H_3PO_4$, HCl and caustic alkali solutions.

EXAMPLES

The invention is illustrated by the following examples in which all parts and percentages are by weight, unless otherwise specified.

EXAMPLE 1

Homogeneously blended kaolin clay (170 grams of 2 to 15 microns average particle size) was mixed with 50.8 grams of PTFE aqueous dispersion (sold under the trade designation "Teflon" 30 and having a 59.7% solids content) and 60 grams of water to give a homogeneous putty-like mass. This putty-like mass was further mixed in an intensive mixer (C. W. Brabender Prep mixer equipped with high shear mixing blades) at 50° C. for about 10 minutes. The mass was then formed into a film by calendering at 50° C. between steel calendering rolls (10 cm in diameter and 25 cm long each) at 50° C., beginning with a 10 mm nip gap and closing the gap on successive passes until a film approximately 0.6 mm thick was obtained. This film was then folded to form an 8 layered structure, rotated 90° to the machine direction and calendered again, beginning with a 10 mm nip gap and reducing the nip gap again until a 0.6 mm composite was formed. The folding, rotating and calendering were repeated two more times. The calendered film was then dried at room temperature for 24 hours, producing a composite film having a tensile strength 1.3 MPa when tested using an Instron tensile testing device.

EXAMPLES 2-4

These examples illustrate the use of additional processing aids to strengthen the composite film. The compositions are shown in the table below. The ingredients were mixed in a sigma blade mixer for two minutes at room temperature and three to five minutes at 100° C. The resulting dough was formed into a film by the process of Example 1.

TABLE I

| Ex. | Kaolin (g.) | PTFE[c] Dispersion (g.) | Water (g.) | Additive | Weight (g.) | Tensile Strength MPa |
|---|---|---|---|---|---|---|
| 2 | 70 | 25.4 | 30 | polyethylene[d] oxide (MW 750) | 15 | 6.3 |
| 3 | 70 | 25.4 | 35 | polyoxyethylene[e] distearate | 15 | 6.3 |
| 4 | 75 | 25.4 | 35 | Lecithin | 10 | 5.7 |

[c]Sold under the trade designation "Teflon" 30
[d]Sold under the trade designation "Carbowax" 750
[e]Sold under the trade designation "Emerest" 2642

EXAMPLE 5

This example illustrates the use of a pigment coupling agent to strengthen the composite film.

A mixture of 82.5 g kaolin clay, 25.4 g PTFE aqueous dispersion ("Teflon" 30), 30 g water and 2.5 g isopropoxy titanium tristearate sold under the trade designation "Ken React TTS" was mixed in a sigma blade mixer for two minutes at room temperature and three to five minutes at 100° C. The resulting dough was formed into a sheet by the process of Example 1. The resulting composite sheet when dried had a tensile strength of 4.2 MPa.

EXAMPLE 6

This example illustrates the strengthening of the composite sheet by the addition of a second particulate material and a processing aid.

A mixture of 75 g kaolin clay, 10 g vermiculite (80–100 mesh) 10 g polyethylene oxide having a MW of 750 ("Carbowax" 750), 25.4 g PTFE aqueous dispersion ("Teflon" 30) and 40 g water was stirred to give a homogeneous paste. This paste was mixed for about ten minutes at 50° C. in a C. W. Brabender Prep mixer (as described in Example 1) and formed into a sheet by calendering according to the process of Example 1. The resulting composite sheet when dried had a tensile strength of 2.9 MPa.

EXAMPLE 7

The composite sheet of Example 1 (85% kaolin clay, 15% PTFE) was tested for micro-biological filtration. The sheet was cut to form a 50 mm diameter filter membrane and placed on a sterile filter apparatus (sold under the trade designation "Millipore") and clamped in place. A culture of *Escherichia coli* which had been grown overnight (ca. 500 ml) was then poured onto the filter membrane and suction applied. Upon completion of the filtration, the aqueous filtrate was cultivated for bacterial count. It was found to be sterile even after 24 and 48 hours.

EXAMPLE 8

The porosity of a composite sheet made from 85% kaolin and 15% PTFE (Example 1) was measured using a commercially available porosity measuring device (sold under the trade designation "Amicon" ultrafiltration cell Model #402). This test sample was 0.15 mm thick and 7.5 cm in diameter. The flow rate (F) in cc/min through this sample (44.2 cm$^2$) was a function of the applied pressure (p in atm.) and determined by the equation F=35 p. The membrane was used to remove algae from water samples obtained from the St. Paul, Minnesota municipal water supply, which smells and tastes characteristically of algae during certain summer months. The filtrate was odorless and tasteless indicating complete removal of the objectionable contaminates. A green tint was noted on the surface of the membrane, indicating the presence of the removed algae.

The same apparatus with a second membrane was used to clarify raw wine. The yeast and other suspensoid was removed completely by filtration in the above system affording a crystal clear filtrate devoid of all yeast taste and odor. The flavor of the filtered wine was equivalent to high quality clarified product prepared in the usual way.

EXAMPLES 9-23

Examples 9-23 illustrate the effect of heat on strengthening the composite film by controlled intensive mixing. In each case, 200 g kaolin clay, 60 g PTFE aqueous dispersion ("Teflon" 30), and 140 g water were stirred to form a homogeneous paste which was mixed in a C. W. Brabender Prep mixer for the time and at the temperature shown in Table 2 below. The dough obtained from the intensive mixer was then formed into a film by calendering at 50° C., beginning with a 10 mm nip gap and closing the gap on successive passes until a film approximately 0.6 mm thick was obtained. This film was then folded to form an eight-layer structure, rotated 90° and calendered. The folding, rotating and calendering steps were repeated once to produce a film approximately 0.5 mm thick. After drying for 24 hours at 20° C., film tensile strengths were determined on an "Instron" tester according to ASTM D1708-66.

TABLE 2

| Ex. | Mixing Temp. °C. | Mixing Time Minutes | Tensile Strength MPa |
| --- | --- | --- | --- |
| 9 | 30 | 5 | 0.27 |
| 10 | 30 | 10 | 0.19 |
| 11 | 60 | 3 | 0.28 |
| 12 | 60 | 4 | 0.34 |
| 13 | 60 | 5 | 0.62 |
| 14 | 60 | 7.5 | 1.15 |
| 15 | 60 | 10 | 0.77 |
| 16 | 75 | 2 | 0.23 |
| 17 | 75 | 4 | 1.30 |
| 18 | 75 | 5 | 1.71 |
| 19 | 75 | 6 | 1.39 |
| 20 | 90 | 2 | 2.12 |
| 21 | 90 | 3 | 3.09 |
| 22 | 90 | 3.5 | 2.03 |
| 23 | 90 | 4 | 1.41 |

Figure 3:
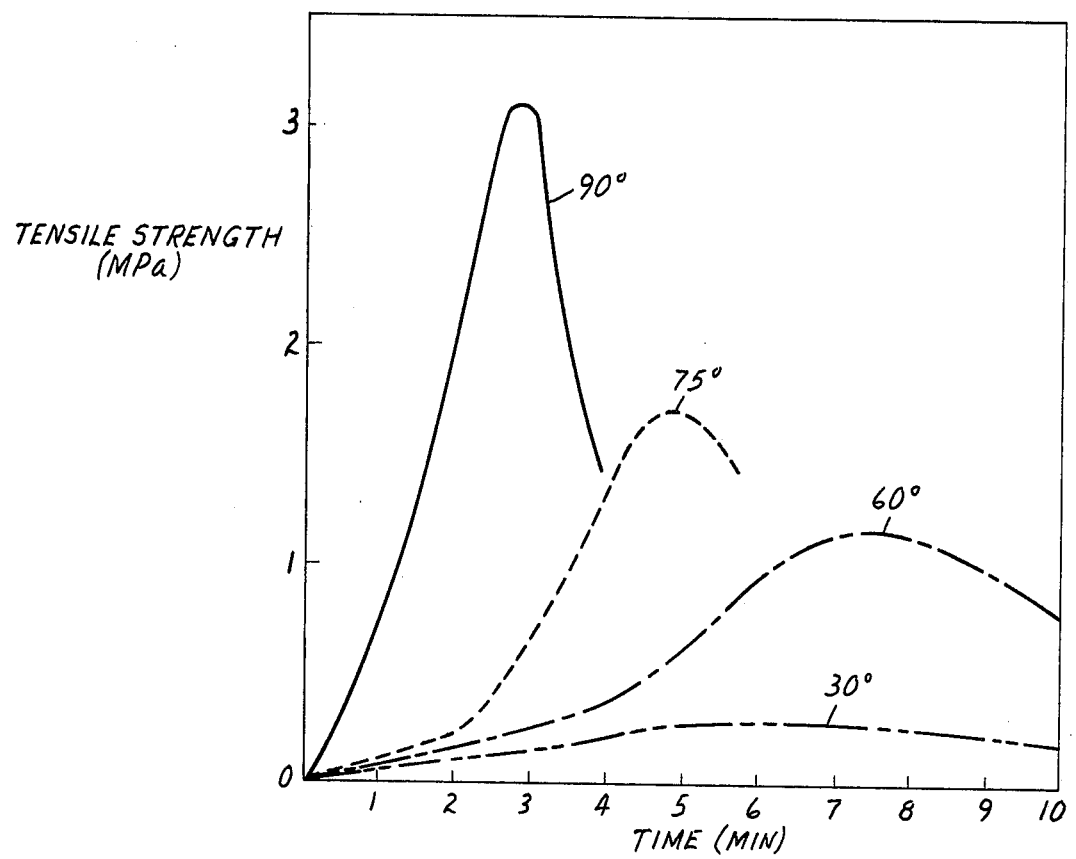
FIG. 3 shows 4 plots of the tensile strength expressed in megapascals (MPa) of composites made in accordance with this invention as a function of batch mixing time in minutes, with the mixing temperature in degrees centigrade being shown adjacent each plot.

FIG. 3 shows graphically the results of this series. Note that low temperature mixing, e.g., 30° C., produces a low tensile strength composite, while higher mixing temperatures produce films of higher tensile strength. Note also that long term intensive mixing at low temperatures does not increase the tensile strength.

EXAMPLE 24

The following example illustrates the use of an additive particulate material to strengthen the composite sheet. A mixture of 75 g of kaolin clay, 10 g of vermiculite (80-100 mesh), 25.4 g of PTFE aqueous dispersion ("Teflon" 30) and 50 g of water was stirred to give a homogeneous paste. This paste was further mixed at 50° C. for about 10 minutes in an intensive mixer (C. W. Brabender Prep mixer) and formed into a composite sheet by calendering according to the process of Example 1. The resulting film, when dried, had a thickness of about 0.6 mm and a tensile strength of 2.61 MPa.

EXAMPLE 25

The following example illustrates the preparation of composite sheet material using calcium carbonate as the particulate material. Calcium carbonate (200 g of 0.5 to 45 microns particle size treated with 1% by weight isopropoxy titanium tristearate, available from Sylacauga Calcium Products as "CC-100"), was mixed with 60 g of PTFE aqueous dispersion ("Teflon" 30) and 20 g of water to give a homogeneous paste. This paste was further mixed in an intensive mixer (C. W. Brabender Prep mixer) at 90° C. for about 40 seconds and formed into a composite sheet by calendering according to the process of Example 1. The film, when dried, had a thickness of about 0.7 mm and a tensile strength of 3.46 MPa.

EXAMPLE 26

A mixture of 80 grams of PTFE aqueous dispersion ("Teflon" 30), 48 g of titanium dioxide, 48 g of corn starch, 96 g of potato starch and 145 g of water stirred to form a homogeneous paste. This paste was further mixed for about 30 seconds at 60° C. in an intensive mixer (C. W. Barbender mixer) and formed into a composite sheet by calendering according to the process of Example 1. The resulting sheet, when dried, had a thickness of about 0.6 mm and a tensile strength of 2.53 MPa.

EXAMPLE 27

To establish the necessity of maintaining the water level in the mixture above the absorptive capacity of the solids during the mixing and calendering operations of the present invention, a mixture of 100 g of kaolin clay, 30 g of PTFE aqueous dispersion ("Teflon" 30), and 70 g of water was stirred to form a homogeneous paste. This paste was spread on a tray and dried at room temperature for 48 hours and 100 g of the dry mixture was stirred with 52 g of water and formed into a composite sheet by calendering according to the method of U.S. Pat. No. 3,890,417, Example 1. The resulting film, when dried, had a thickness of about 1.7 mm and a tensile strength of 0.26 MPa. By contrast, composite films according to the present invention have a tensile strength of at least one megapascal.

What is claimed is:

1. A method of making high tensile strength polytetrafluoroethylene composite sheet material comprising:
    (1) dry blending one or more types of particulate material;
    (2) blending said particulate material with polytetrafluoroethylene particles in a weight ratio of about 3:1 to 50:1 particulate material to polytetrafluoroethylene particles to form a putty-like mass, wherein said polytetrafluoroethylene particles have a particle size in the range of 0.05 to 0.5 microns and are added in the form of an aqueous dispersion comprised of about 30% to about 70% by weight solids;
    (3) adding sufficient lubricant water to said mass to exceed the absorptive capacity of the solids yet maintain a putty-like consistency;
    (4) mixing said putty-like mass in an intensive mixer at a temperature between 50° C. and 100° C. for a time sufficient to cause initial fibrillation of said polytetrafluoroethylene particles;
    (5) biaxially calendering said putty-like mass between calendering rolls maintained at about 50° C. to about 100° C. to cause additional fibrillation of said polytetrafluoroethylene particles to form a self-supporting sheet, while maintaining the water content of said mass at least at a level above the absorptive capacity of the solids and also closing the gap between the calendering rolls with each successive calendering operation, for a time sufficient to produce a high tensile strength sheet having a tensile strength of at least one megapascal; and
    (6) drying the resultant sheet to remove water.

2. The method of claim 1 wherein said particulate material has an irregular shape.

3. The method of claim 1 wherein said particulate material has a spherical shape.

4. The method of claim 1 wherein said particulate material is a mixture of particles having a spherical shape and particles having an irregular shape.

5. The method of claim 1 wherein said particulate material has an average particle size in the range of 0.1 to 600 microns.

6. The method of claim 5 wherein said particulate material comprises two or more particle size ranges.

7. The method of claim 6 wherein one of said particulate materials is vermiculite having an average particle size of about 150 to about 250 microns.

8. The method of claim 6 wherein one of said particulate materials is kaolin having an average particle size of about 2 to about 20 microns.

9. The method of claim 1 wherein there is added during or prior to step (2) up to 100% by weight on a dry basis of synthetic or natural polymer selected from the group consisting of polyethylene, polypropylene, hexafluoropropylene tetrafluoroethylene copolymer, ionomer, polychlorotrifluoroethylene, styrene butadiene block copolymer ethylene vinyl acetate copolymer, cellulose acetate, polyurethane, and polyamide.

10. The method of claim 1 wherein said particulate material is selected from the group consisting of Kaolin, carbon, talc, titanium dioxide, silica, lead, copper, zinc, aluminum, iron, steel, copper oxide, ferrous oxide, barium ferrite, mica, molybdenum sulfide, silicon carbide, vermiculite, calcium carbonate, casein, zein, alumina, garnet, phthalocyanine pigment, glass, polyethylene, polypropylene and polyurethane, or mixtures thereof.

11. The method of claim 1 wherein there is added during or prior to step (2) from about 0.2% to about 2% by weight supplemental wetting agent.

12. The method of claim 11 wherein said supplemental wetting agent is selected from the group consisting of zinc stearate and ammonium perfluorooctoate.

13. The method of claim 1 wherein there is added during or prior to said step (2) sufficient partially hydrolyzed polyacrylamide to enhance the drapability of said composite sheet.

14. The method of claim 1 wherein there is added during or prior to said step (2) from about 5% to about 10% by weight of the total solids water-swellable thermoplastic material.

15. The method of claim 14 wherein said water-swellable thermoplastic material is selected from a group consisting of casein, zein, cross-linked hide glue and polyamide.

16. The method of claim 1 wherein there is added during or prior to said step (2) up to about 30% by weight of the total solids abrasive particles having a size in the range of about 5 to 60 microns and a Mohs hardness in the range of about 6.0 to about 9.5.

17. The method of claim 1 wherein there is added during or prior to said step (2) from about 1% to about 25% by weight based upon the total solids dispersing agent selected from the group consisting of polyoxyethylene oxide, polyoxyethylene distearate and lecithin.

* * * * *